(12) United States Patent
Voelz et al.

(10) Patent No.: US 11,642,785 B2
(45) Date of Patent: May 9, 2023

(54) COLLISION-FREE MOTION PLANNING FOR CLOSED KINEMATICS

(71) Applicant: PILZ GMBH & CO. KG, Ostfildern (DE)

(72) Inventors: Andreas Voelz, Neunkirchen am Brand (DE); Knut Graichen, Ostfildern (DE); Daniel Bakovic, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 294 days.

(21) Appl. No.: 16/900,396

(22) Filed: Jun. 12, 2020

(65) Prior Publication Data
US 2020/0376663 A1 Dec. 3, 2020

Related U.S. Application Data

(63) Continuation of application No. PCT/EP2018/084215, filed on Dec. 10, 2018.

(30) Foreign Application Priority Data

Dec. 12, 2017 (DE) ...................... 10 2017 129 665.4

(51) Int. Cl.
*B25J 9/16* (2006.01)
*B25J 9/00* (2006.01)

(52) U.S. Cl.
CPC ........... *B25J 9/1664* (2013.01); *B25J 9/0084* (2013.01); *B25J 9/1666* (2013.01); *B25J 9/1669* (2013.01);
(Continued)

(58) Field of Classification Search
CPC ...... B25J 9/1664; B25J 9/0084; B25J 9/1666; B25J 9/1669; G05B 2219/40476; G05B 2219/50391
See application file for complete search history.

(56) References Cited

U.S. PATENT DOCUMENTS

| 4,990,838 A | 2/1991 | Kawato et al. |
| 2012/0239167 A1* | 9/2012 | Carrette ........... G05B 19/41865 700/52 |

(Continued)

FOREIGN PATENT DOCUMENTS

| CN | 105 302 062 B | 10/2017 |
| DE | 69030592 T2 | 9/1997 |

(Continued)

OTHER PUBLICATIONS

Chu et al.: Path planning and Collision Avoidance for a Multi-Arm Apace Maneuverable Robot; IEEE Transations on Aerospace and Electronic systems, Bd. 54, Nr.1, Aug. 31, 2017, pp. 217-232.
(Continued)

*Primary Examiner* — Jason Holloway
(74) *Attorney, Agent, or Firm* — Miller Johnson

(57) ABSTRACT

A method is described for collision-free motion planning of a first manipulator with closed kinematics. The method includes defining a dynamic optimization problem, solving the optimization problem using a numerical approach, and determining a first movement path for the first manipulator based on the solution of the optimization problem. The dynamic optimization problem includes a cost function that weights states and control variables of the first manipulator, a dynamic that defines states and control variables of the first manipulator as a function of time, and at least one inequality constraint for a distance to collisions. Furthermore, the optimization problem includes at least one equality constraint for the closed kinematics.

25 Claims, 4 Drawing Sheets

(52) U.S. Cl.
CPC .............. *G05B 2219/40476* (2013.01); *G05B 2219/50391* (2013.01)

(56) References Cited

U.S. PATENT DOCUMENTS

| | | | | |
|---|---|---|---|---|
| 2014/0114463 | A1* | 4/2014 | Shilpiekandula | G05B 19/19 700/173 |
| 2015/0051734 | A1* | 2/2015 | Zheng | B62D 57/032 901/1 |
| 2016/0288256 | A1* | 10/2016 | Di Cairano | G05B 19/41 |
| 2019/0118384 | A1* | 4/2019 | Dali | B25J 19/0008 |

FOREIGN PATENT DOCUMENTS

| | | |
|---|---|---|
| DE | 196 25 637 A1 | 1/1998 |
| DE | 20 2005 007 654 U1 | 10/2005 |
| DE | 102004 021 389 A1 | 11/2005 |
| DE | 10 2008 029 657 A1 | 12/2009 |
| DE | 10 2015 103 451 A1 | 9/2016 |
| JP | H02159672 A | 6/1990 |
| JP | 2005007486 A | 1/2005 |
| JP | 2014104530 A | 6/2014 |

OTHER PUBLICATIONS

Yoshida et al.: Online Replanning for Reactive Robot Motion: Practical Aspects; Intelligent robots and systems (IROS), 2010 IEEE/RSJ International Conference on, IEEE, Piscataway, NJ, USA, Oct. 18, 2010, pp. 5927-5933.

Wojciech Szynkiewicz et al.; Optimization-based approach to path planning for closed chain robot systems; International Journal of Applied Mathematics and Computer Science; Bd. 21, No. 4; Dec. 1, 2011 (Dec. 1, 2011), pp. 659-670.

Chettibi T et al.; Generating optimal dynamic motions for closed-chain robotic systems; European Journal of Mechanics, A, Solids,Gauthier-Villars, Paris, FR, Bd. 24, No. 3, May 1, 2005, pp. 504-518.

Kapernick Bartosz et al.; The gradient based nonlinear model predictive control software GRAMPC; 2014 European Control Conference (ECC); EUCA, Jun. 24, 2014; pp. 1170-1175.

Japanese Office Action for JP 2020531772; dated Jun. 9, 2021; 7 pages.

* cited by examiner

US 11,642,785 B2

COLLISION-FREE MOTION PLANNING FOR CLOSED KINEMATICS

CROSS-REFERENCE TO RELATED APPLICATIONS

This application is a continuation of International Application No. PCT/EP2018/084215 filed on Dec. 12, 2018, which claims priority to German Patent Application No. 10 2017 129 665.4 filed on Dec. 12, 2017. The entire disclosures of the applications referenced above are incorporated by reference.

FIELD

The present disclosure relates to computerized motion control and more particularly to method and apparatus for collision-free motion planning of a first manipulator with closed kinematics.

BACKGROUND

Collision-free motion planning in robotics is the search for a motion path for a robot or its manipulator from a starting point to an end point without colliding with itself or an obstacle. A closed kinematic system is defined as one that has at least one closed kinematic chain. This is the case when a manipulator is kinematically connected to its base in two different ways. A closed kinematic chain is formed, for example, by a robot and an element moveably mounted on the floor or wall, or by several manipulators of a robot that jointly grip and move an object. Motion planning must then be carried out in such a way that the closed kinematics are fulfilled at all times, i.e. a robot must move in such a way that it does not lose contact with the fixed element or the object that is jointly carried. For motion planning, the closed kinematics thus presents an additional restriction of freedom of movement.

For the common sample-based motion planners, such as probabilistic road maps (PRM) or rapidly-exploring random trees (RRT), closed kinematics is a major challenge because the probability that a random configuration will meet the additional constraint is close to zero. Although approaches are known which generate permissible configurations from random samples by a simple gradient descent, these are associated with high computational times if a very large number of samples are required to solve the problem. In addition, probabilistic methods have the problem that no deterministic trajectories are generated, i.e. the computing time can be limited, but is generally not predictable.

In addition to probabilistic methods, optimization-based methods are known which are designed to generate directly a smooth and natural movement of a robot or its manipulator without detours. Optimization-based methods can provide deterministic trajectories that are reproducible and determinable in finite computational time. The prerequisite for an optimization-based method is the formulation of a suitable optimization problem that adequately represents the motion planning.

SUMMARY

It is an object of the present disclosure to specify a method for motion planning for closed kinematics. Further, it is an object to specify a method for motion planning that avoids self-collisions and collisions with obstacles. Further, it is an object to specify a method for motion planning that allows the determination of deterministic trajectories with respect to reproducibility and computing time. Yet further, it is an object to specify a method for motion planning that allows trajectories to be adapted to changing environments.

According to an aspect of the present disclosure, there is provided a method for collision-free motion planning of a first manipulator with closed kinematics with the steps:
defining a dynamic optimization problem,
solving the optimization problem via a numerical approach, and
determining a first movement path for the first manipulator based on the solution of the optimization problem,
wherein the dynamic optimization problem comprises a cost function that weights states and control variables of the first manipulator, a dynamic that defines states and control variables of the first manipulator as a function of time, at least one inequality constraint for a distance to collisions, and at least one equality constraint for closed kinematics.

According to a further aspect of the present disclosure, there is provided an apparatus comprising a first manipulator and a control unit, wherein the control unit is configure to carry out the above method for collision-free motion planning.

It is thus an idea to formulate collision-free motion planning with closed kinematics as an optimization problem and to solve it numerically. The optimization problem is a dynamic problem, which considers the dynamics of the manipulator with respect to its states and control variables, and which weights them by means of a cost function. The dynamics represent the progress of the states and control variables in time. The states may be positions in space indicated by joint angles, and the control variables may be joint angular velocities (integrator) or joint angular accelerations (double integrator).

The cost function weights the states and control variables. The cost function may only penalizes the control variables with a weighting matrix in order to minimize the speeds or accelerations. This formulation is equivalent to the search for the shortest path between a starting position of the robot and the target position to be reached.

In order to consider the closed kinematics and to avoid self-collisions or collisions with obstacles, the dynamic optimization problem is supplemented by equality constraints and inequality constraints. The inequality constraints can be used to define unilateral limits that must be observed in order to exclude self-collisions and collisions with obstacles. Equality constraints, on the other hand, are specific requirements that must be met, but can change dynamically with the movement of the manipulator. Via equality constraints, it can be ensured that the conditions specified by the closed kinematics are observed during movement.

The dynamic optimization problem including the at least one inequality constraint and the at least one equality constraint is subsequently solved with a numerical approach. Known approaches for the numerical solution can be used, since the motion planning which is formulated as a dynamic optimization problem including the equality constrains and the inequality constraints, does not differ from known dynamic optimization problems. Thus, known measures can be applied to make the dynamic optimization problem deterministic.

Altogether, the formulation of the motion problem as a dynamic optimization problem with inequality constraints and equality constraints allows a simplified motion planning, which can produce deterministic trajectories and allows a collision-free motion control of the manipulator under the conditions of closed kinematics.

In a further refinement, the dynamic optimization problem includes additional boundary conditions that define a start condition and an end condition, in particular a start position and a target position of the first manipulator.

Using the additional boundary conditions, further parameters can be directly considered in the motion planning, so that, for example, the motion planning can be started immediately without having to transfer the manipulator into an initial position.

In a further refinement, the dynamic optimization problem further comprises one or more control variable constrains defining minimum and maximum values of the control variables, in particular values for minimum and maximum speeds and/or accelerations of the first manipulator.

Using additional control variable restrictions allows the motion planning to be limited directly to only realizable movements of the first manipulator. Capabilities of the manipulator can thus be directly taken into account in the solution of the dynamic optimization problem.

In a further refinement, the dynamic optimization problem further comprises one or more state constraints defining the limits of the states, in particular minimum and maximum joint angles and/or joint angular velocities of the first manipulator.

In this refinement, restrictions in the positions of the manipulator can be directly accounted for. For example, spaces can be defined that the manipulator can theoretically reach but is not supposed to. For example, a defined workspace can be defined for a manipulator, which is immediately taken into account during motion planning.

In a further refinement, the dynamic optimization problem further comprises a defined end time, which represents a duration of the movement. The duration of the movement to be planned is therefore part of the optimization problem and must be taken into account during the motion planning.

In various implementations, the end time can be fixed or weighted by the cost function. In the first case, the length of time a movement may take is fixed, while in the second case it is optimized as a further variable. In the latter case, the end time is weighted by the cost function, wherein a minimum value and a maximum value may be specified.

In a further refinement, the at least one inequality constraint for a distance to collisions defines a minimum distance to collisions. The inequality restriction thus determines how close the manipulator may approach an obstacle or how much distance it must keep from itself.

In a further refinement, the at least one equality constraint for the closed kinematics defines a first dynamic position constraint and/or a first dynamic orientation constraint. The equality constraint thus imposes a dynamic constraint for the position or orientation of the manipulator during the movement. The condition of a closed kinematic can thus be maintained during movement by translational and rotational restrictions.

In a further refinement, the numerical approach includes the transformation of the dynamic optimization problem from a constrained optimization problem into an unconstrained optimization problem. The transformation of the dynamic optimization problem into an unconstrained optimization problem enables a particularly efficient solution of the optimization problem, wherein known methods for solving unconstrained optimization problems can be used.

In a further refinement, the at least one equality constraint for closed kinematics and the at least one inequality constraint for a distance to collisions is multiplied by a multiplier and added to the cost function. Furthermore, at least one equality constraint for closed kinematics and at least one inequality constraint for a distance to collision can be multiplied by a penalty parameter in squared form and added to the cost function. The numerical solution can be thus based on the extended Lagrange method. Multipliers and penalty parameters are determined for all constraints and the constraints with the multipliers and penalty parameters are added to the cost function. This results in a max-min optimization problem without restrictions with an underlying minimization with respect to the control variables and an overlaid maximization with respect to the multipliers.

In various implementations, the multipliers and penalty parameters are iteratively adjusted when solving the dynamic optimization problem and the unconstrained optimization problem is solved with a gradient approach.

In a further refinement, the method comprises the execution of the first trajectory, wherein the execution of the first trajectory is performed in parallel to the solution of the optimization problem. Planning and execution can thus take place in parallel, reducing the necessary computing time before the movement begins. Frequent re-planning can also be avoided by further optimizing the trajectory during execution.

In various implementations, the dynamic optimization problem for the case of parallel planning and execution has an end time which represents the duration of the movement, and the numerical approach generates in a first step a first partial solution for at least one first period which is smaller than the duration of the movement, and the numerical approach generates in at least one second step a second partial solution for a second period, wherein an adapted optimization problem is used for the second period which corresponds to the dynamic optimization problem and takes into account a state at the end of the first period as an initial condition.

Motion planning is thus carried out successively. Since motion planning with closed kinematics is much more difficult than with open kinematics and requires considerably more time for calculation, the necessary calculation time before the start of the motion can be reduced by successive and parallel planning and execution. It is therefore an idea to successively further optimize the trajectory. The motion can already be executed, although it is not yet completely collision-free. Since the further optimization is adapted to the changed environmental conditions, a local evasion behavior automatically results. The optimization on a moving horizon thus allows an iterative improvement of the solution and adaptation of the trajectory to changing environmental conditions. A start with a suboptimal solution becomes possible, whereby the solution is further improved during execution.

In a further configuration, the method further comprises the determination of a second movement path for a second manipulator, wherein the cost function additionally weights the states and control variables of the second manipulator and the dynamic defines the states and control variables of the second manipulator as a function of time, and wherein the first manipulator and the second manipulator form the closed kinematics.

In this refinement, two trajectories are thus determined on the basis of the dynamic optimization problem, with which two manipulators can be moved in such a way that the manipulators form a closed kinematic chain. In other words, an optimization problem realizes the control of a two-arm robot, which are connected to each other, for example by jointly moving an object. The refinement contributes to an efficient implementation of a controller for a two-arm or multi-arm robot.

In various implementations, the at least one equality constraint for the closed kinematics comprises in this case a first dynamic position constraint and/or a first dynamic orientation constraint of the first manipulator and a second dynamic position constraint and/or a second dynamic orientation constraint of the second manipulator, which are in a defined, fixed relationship to each other, so that the closed kinematics is fulfilled. The equality constraint of the optimization problem is thus defined by a fixed relationship with respect to the position and/or orientation of the first and second manipulator.

It is understood that the features mentioned above and the features to be explained below can be used not only in the combination indicated, but also in other combinations or uniquely, without leaving the scope of this disclosure.

BRIEF DESCRIPTION OF THE DRAWINGS

Embodiments of the disclosure are shown in the drawings and are explained in more detail in the following description.

DETAILED DESCRIPTION

Figure 1:
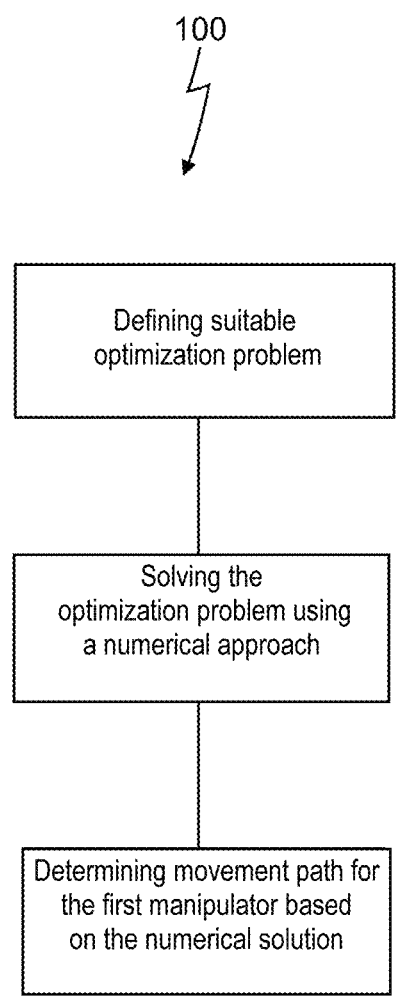
FIG. 1 is a block diagram of a method according to an example embodiment.

In FIG. 1, an example of the new procedure in its entirety is marked with the reference number 100.

The method starts with the formulation of a suitable optimization problem for motion planning in step 102. The basis of the optimization problem is a system model that describes the dynamics of the moving system with respect to the possible states and control variables as a function of time. Furthermore, the optimization problem includes a cost function that specifies the goal of the optimization. The cost function contains one or more functions that weight the parameters of the system model.

The goal of optimization is to find a function of an independent variable (usually a time function) that minimizes the cost function. In other words, in the case of motion planning, one goal is to find an optimal input trajectory that can be used to control the manipulator. This is also referred to as optimal control problem.

The optimization problem also includes constraints that restrict free movement in space. The constraints must be taken into account when planning the motion. The constraints include at least one inequality constraint that takes into account obstacles in space and at least one equality constraint that takes into account kinematic constraints.

The result of step 102 is a formal representation of the system, its limits and the desired optimization.

Then, in step 104, the optimization problem is solved, i.e. the function that minimizes the cost function is searched. This is done using a numerical approach, for instance, computer-aided. Instead of a concrete solution, the numerical approach allows an approximate calculation of the optimization problem. Thus, a solution can also be specified if no explicit solution presentation is possible or if it cannot be found in a reasonable period.

A large number of different numerical methods and programs are known with which the optimization problem can be solved in principle. Which approach is best suited depends on various factors, including the required accuracy or the available computing time. It shall be noted that the disclosure is not limited to a specific numerical solution approach.

The result of step 104 is an optimal solution function or an approximation of this optimal function with sufficient accuracy.

Based on the optimal solution function or its approximation, a concrete motion path for the first manipulator is determined in step 106. This means that based on the numerical solution the movement of the manipulator is defined. In the simplest case, the solution of the optimization problem is an optimal input trajectory, which can be directly converted into a motion control of a manipulator. The method according to the disclosure may thus provide directly and immediately the desired control, which in principle leads to a smooth and natural movement of the manipulator.

Since, as will be explained in more detail in the following, the optimization problem takes into account obstacles via the at least one inequality constraint and the closed kinematics via the at least one equality constraint, the method generates overall a smooth and natural movement of the manipulator around the obstacles and without violating the requirement for the closed kinematics. Thus, the various problems of motion planning (obstacles, kinematics) can be fully taken into account, whereby planning can be made iterative and especially deterministic through the numerical approach. The planning times are short and determinable, which makes a real-time implementation of motion planning possible. The resulting movement is natural, collision-free and takes into account the closed kinematics.

Figure 2:
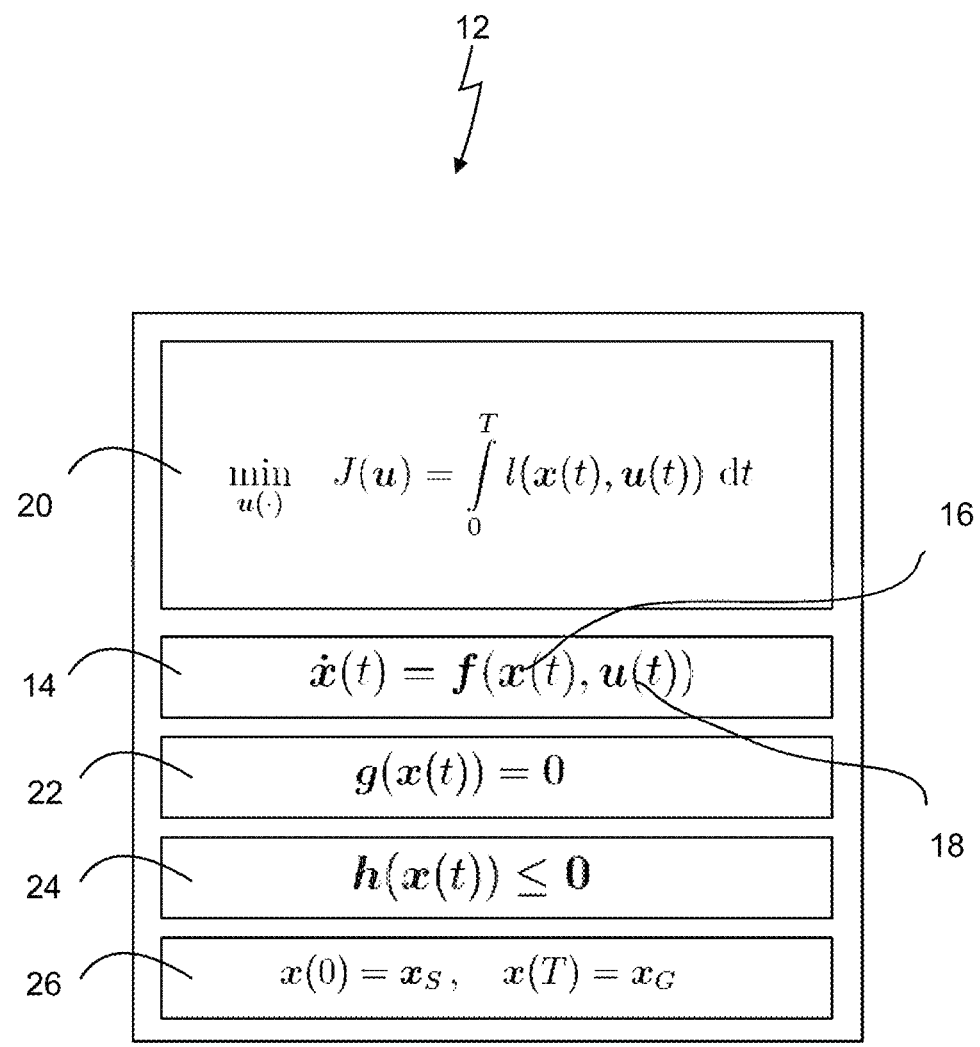
FIG. 2 is a formal representation of an optimization problem according to an example embodiment.

FIG. 2 shows a formal representation of the dynamic optimization problem, which here is designated in its entirety by reference numeral 12. Starting point is the system model, which describes the dynamics 14 of the moving system, for example the manipulator, with its states 16 and control variables 18. Dynamics 14 can be assumed in a simplified way as an integrator $\dot{q}=u$ with the states X=q and the control variables $\dot{q}$, or as a double integrator $\ddot{q}=u$ with the states $$x[q^T, \dot{q}^T]^T$$

and the control variables u=$\ddot{q}$.

If only one path is to be calculated with the optimization without time parameterization, the simple integrator is sufficient as a system model. If, on the other hand, the calculated trajectory is to be executed directly, the double integrator should be used, since here the minimum and maximum acceleration can be taken into account.

The cost function 20 weights the states 16 and control variables 18. The task of optimization is to find the optimum control function from the usually infinite number of control functions, which minimizes the cost function 20.

Via the at least one equality constraint 22, closed kinematics of the system are taken into account while planning. A closed kinematic system is given if there is at least one closed kinematic chain. This is the case, for example, when a manipulator is kinematically connected to its base in two different ways.

Closed kinematics is also given if a robot has several manipulators that are connected to each other, for example, if the manipulators jointly lift and move a workpiece. In this case, a pose of the end effectors of the respective manipulators is always relative to a pose of the end effectors of the respective other manipulators. Thus, there is a constraint in poses that the individual manipulators can have to each other, which is represented in pairs as an equality constraint $(P_1(x)P_{relativ}=P_2(x))$ The equality constraints thus define dynamic limits that must be considered when solving the dynamic optimization problem. In other words, the condition of a closed kinematics flows into the optimization problem to be solved as an additional constraint. Thereby, the closed kinematics are directly taken into account in motion planning and are an integral component of motion planning itself.

Furthermore, the dynamic optimization problem 12 includes at least one inequality constraint 24, by which obstacles in space can be considered. Preferably, the at least one inequality constraint establishes a minimum distance from collisions with obstacles in space. The calculation of this collision distance and its partial derivatives according to the states represents the most complex part of the optimization problem.

With the inequality constraints 24, the distance to self-collisions and the distance to collisions with obstacles can be taken into account. To calculate the distance for self-collisions, in an example embodiment, an approximation of the robot can be which approximates the robot using a plurality of balls having center and radius. For the collision with obstacles, an approximation of the environment can be made by means of a raster map, whereby the distance to be taken into account results from the Euclidean distance transformation of the raster map. The smallest distance is taken into account either to the self-collision and/or to the collision with an obstacle.

It goes without saying that, in addition to the constraints mentioned, further boundary conditions 26 and constraints can be covered by the dynamic optimization problem 12. In particular, further inequality constraints 24 may be envisaged, which define upper and lower limits of possible states. For example, limits for minimum and maximum joint angles can be defined and taken into account by the optimization problem. Furthermore, control variables are conceivable which define minimum and maximum values of the control variables, in particular minimum and maximum speeds and/or accelerations of the first manipulator.

In various implementations, the duration of the movement specified by a defined end time T may also be considered. Either the end time T can be fixed depending on the start state and the end state or it can be a component of the optimization as a further variable. In the latter case, the time is weighted by the cost function 20. A minimum value and a maximum value can be defined for the end time. By considering the end time T, a deterministic behavior of the optimization can be achieved.

Solving the dynamic optimization problem 12, as presented here, can be achieved in different ways and by different numerical approaches. In various implementations, the numerical solution of the dynamic optimization problem 12 can be achieved by a gradient approach in combination with the extended Lagrange method. In this approach, the dynamic optimization problem with constraints is transferred into an unconstrained optimization problem. In other words, the optimization problem is reduced to the optimization of an auxiliary function that has no constraints. For the transformation, the constraints are multiplied by factors, the so-called Lagrange multipliers, and embedded into the target function. Positive Lagrange multipliers are used to punish a violation of the constraints.

The extended Lagrange method further includes a quadratic tightening function, which is embedded into the target function using an additional multiplier.

The resulting auxiliary function, also called the extended Lagrange function, is $$L(x,\mu,\rho)=f(x)+\mu g(x)+½\rho g(x)^2$$

with the Lagrange multiplier $\mu$ and the penalty parameter $\rho$. The front portion of the equation $f(x)+\mu g(x)$ corresponds to the usual Lagrange function and the rear portion $½\rho g(x)^2$ to a square tightening function. Assuming strong duality and the existence of an optimal solution $x^*$, $\mu^*$, it can be shown that for each $\rho \geq 0$ the saddle point condition $$L(x^*,\mu,\rho) \leq L(x^*,\mu^*,\rho) \leq L(x,\mu^*,\rho)$$

must be fulfilled. From this, it is apparent that the Lagrange function must be minimized with respect to the variable x and maximized with respect to the Lagrange multipliers $\mu$, i.e. a new optimization problem $$\max_{\mu}\min_{x} L(x, \mu, \rho)$$

must be solved.

For solving this problem, at first, the underlying minimization problem $$x^{(k+1)} = \mathrm{argmin}_{x} L(x, \mu^{(k)}, \rho^{(k)}).$$

is defined via an iteration k, which is solved by a gradient approach. Afterwards the Lagrange multipliers will be updated by the steepest ascent $$\mu^{(k)}=\mu^{(k)}+\rho^{(k)}g(x^{(k)})$$

with the penalty parameter $\rho(k)$ as step size. The convergence of the procedure can be significantly improved by adapting the penalty parameter. The heuristics $$\rho^{(k+1)} = \begin{cases} \beta_{inc}\rho^{(k)} & |g(x^{(k)})| \geq \gamma_{inc}|g(x^{(k-1)})| \wedge |g(x^{(k)})| > \varepsilon_g \\ \beta_{dec}\rho^{(k)} & |g(x^{(k)})| \leq \gamma_{dec}\varepsilon_g \\ \rho^{(k)} & \text{otherwise} \end{cases}$$

with the factors $\beta_{inc}>1$, $\beta_{dec}<1$, $\gamma_{inc}$ and $\gamma_{dec}<1$, and an absolute tolerance $\varepsilon_g$ has been tried and tested.

If the minimization does not result in a sufficient improvement of the constraints, the penalty parameter is further increased. As soon as the constraint is met with the required tolerance, the penalty parameter can be reduced again. The procedure is repeated until a maximum iteration number $k=N_{mult}$ is reached or the minimization is converged and all constraints are met.

The inequality constraints $h(x) \leq 0$ can be transformed into the equality constraints $g(x)=h(x)+z=0$ by introducing slack variables $z \geq 0$. The minimization regarding z can be calculated explicitly and results in $$z^* = \max\left\{0, -\frac{\mu}{\rho} - h(x)\right\}.$$

Inserted in g(x), the equivalent formulation is achieved as $$g_+(x, \mu, \rho) = \max\left\{h(x), -\frac{\mu}{\rho}\right\}$$

without slack variables, which can be used in the Lagrange function. The adaptation rule for the penalty parameter is formed for inequality constraints without the absolute amount.

In the case of several equality constraints and inequality constraints, there is one Lagrange multiplier per constraint. The penalty parameter can be selected either uniformly for all or, as the Lagrange multiplier, separately for each constraint. To improve robustness of the procedure, the update of the multipliers can be skipped if sufficient convergence has not yet been achieved in the minimization. Furthermore, the Lagrange multipliers and the penalty parameters can be limited by minimum and maximum values.

In detail, the gradient approach carries out the following steps in each iteration j, starting from an initial control variable $u^{(0)}(t)$:

Integrating the system starting from the initial condition in forward time to obtain $x^{(j)}(t)$;

Integrating the adjoint system starting from the end condition in backward time to obtain $\lambda^{(j)}(t)$;

Solving the underlying line search problem $$\alpha^{(j)} = \underset{\alpha>0}{\operatorname{argmin}} J\left(\psi\left(u^{(j)} - \alpha g^{(j)}\right)\right)$$

with the search direction:

$$g = \frac{\partial H(x, u, \lambda)}{\partial u} = \left(\frac{\partial l(x, u)}{\partial x}\right)^T + \left(\frac{\partial f(x, u)}{\partial x}\right)^T \lambda$$

The control variable constraints are taken into account by projecting ψ onto the permissible quantity [u−, u+];

Calculating the new control variables $u^{(j+1)} = \psi(u^{(j)} - \alpha^{(j)} g^{(j)})$ and set j=j+1;

Stopping the gradient procedure at $j=N_{grad}$ or when a convergence criterion is reached.

The gradient approach shown here can be implemented relatively easily. The individual iterations require only little computing time and required memory for the approach is low. Especially at the beginning of the procedure, there is usually a significant reduction in the cost function, so that a suboptimal solution is quickly found. However, in order to achieve high accuracy, many iterations are required compared to methods that use second-order information (Hesse matrix).

Figure 3:
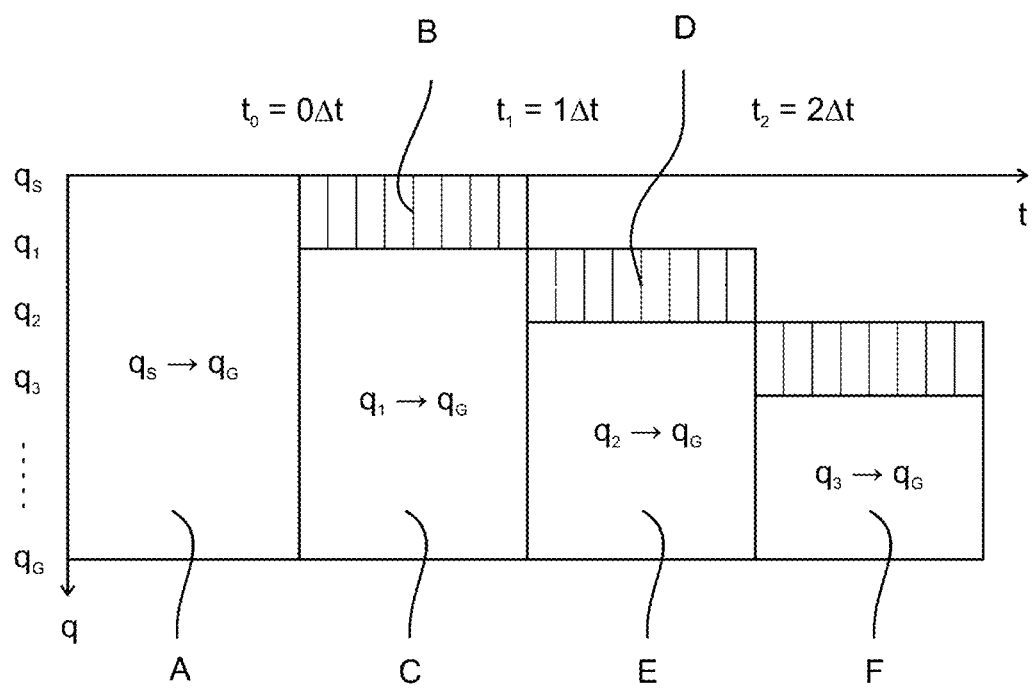
FIG. 3 is a schematic representation of parallel planning and execution according to an example embodiment.

In various implementations, the planning is performed in parallel to the actual execution, i.e. parallel to the actual movement of the manipulator. This principle of parallel planning and execution is illustrated in FIG. 3.

Parallel planning and execution can both reduce the necessary computing time before the start of the movement and avoid the need for frequent re-planning. A trajectory is further optimized during execution. Thus, the trajectory can already be executed, even if it is not yet completely collision-free. In addition, the trajectory can be adapted to changing environmental conditions by further optimization, such that a local evasion behavior is automatically achieved.

In the first time step, the movement from $q_S$ to $q_G$ is planned (A). In the second time step, the beginning of this trajectory up to $q_1=q(\Delta T)$ is executed (B) and at the same time the movement from $q_1$ to $q_G$ is further optimized (C). When the robot has reached position q1, the next portion of the trajectory is immediately executed (D) up to $q_2=q(2\Delta T)$ and the optimization continues from this point (E). This approach is repeated until the target point $q_G$ is reached within one time step (F), so that no further optimization is necessary.

The practical implementation thus requires close interaction between the planning and execution. Each planning step (A, C, D, F) must finish its calculation within the sampling time Δt. In the time step $t_k=k\Delta t$, the calculated trajectory from $q_k$ to $q_G$ must be permissible at least for the next sampling time, i.e. $q_k \rightarrow q_{k+1}$) must be collision-free and comply with the closed kinematics. However, the execution (B, D) only starts when the last movement $q_{k-1} \rightarrow q_k$ is completed, so that the robot is exactly at the position $q_k$ at the transition point. Problems can arise, for example, if there are hops in speed at the transition point. This must be compensated for using a follow-up control.

For predictive planning, the optimization problem presented at the beginning is adjusted in the time step $t_k$ as follows:

$$\min_{\overline{u}(\cdot), T} J(\overline{u}, T) = V(T) + \int_0^T l(\overline{x}(\tau), \overline{u}(\tau)) d\tau$$

$$u.B.v. \ \dot{\overline{x}}(\tau) = f(\overline{x}(\tau), \overline{u}(\tau))$$

$$\overline{x}(0) = x_{k+1} = x(t_k + \Delta t), \overline{x}(T) = x_G$$

$$\overline{u}(\tau) \in [u^-, u^+], \tau \in [0, T]$$

$$T \in [T^-, T^+]$$

$$g(\overline{x}(\tau)) = 0, \tau \in [0, T]$$

$$h(\overline{x}(\tau)) \leq 0, \tau \in [0, T].$$

Here, $\overline{x}$ and $\overline{u}$ denote the internal variables of the optimizer with respect to time $\tau \in [0, T]$ to distinguish them from the real state x(t). The initial condition in particular has changed with regard to the optimization problem, since in time step $t_k$ it must be planned based on the future state $x(t_k+\Delta t)$. Furthermore, the end time T can be considered as a further optimization variable with limits and a weighting by the cost function.

To ensure that the target position $q_G$ is not only asymptotically reached for t→∞, a hard final constraint $q(T)=q_G$ must be set in the optimization problem and the time horizon T must be successively shortened until the target point T=Δt is exactly reached in one step. For this purpose, based on an initial estimation of the time required, the end time T is shortened by Δt after each time step, i.e. $T^{(k+1)}=T^{(k)}-\Delta t$. To realize a time-optimal behavior as well as an adaptation to changed environmental conditions, the end time T must be considered as a free optimization variable.

Especially when planning with closed kinematics, it can happen that the sampling time Δt is not sufficient to calculate a permissible trajectory in the first step. More time must therefore be invested in the optimization before the first step is taken. For this purpose, either the maximum number of iterations $N_{ocp}$ of this precalculation can be limited or a time $T_{validate} < T$ can be predefined. In this case, the execution only starts when the corresponding part of the trajectory is allowed. For example, it can be demanded that the movement must already be collision-free for the next second.

Figure 4:
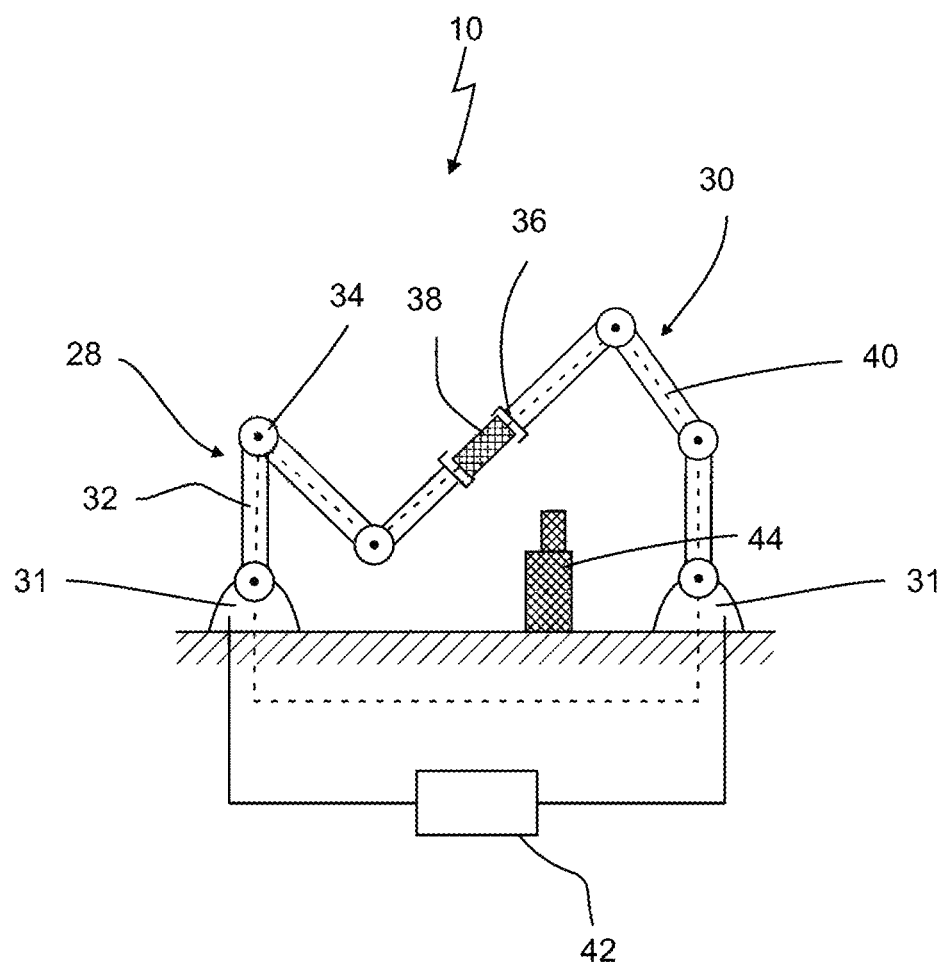
FIG. 4 is schematic representation of an apparatus according to an example embodiment.

FIG. 4 shows an example embodiment of a corresponding apparatus. The apparatus is designated here in its entirety by reference numeral 10 and illustrated as a two-arm robot with a first manipulator 28 and a second manipulator 30 in this example embodiment. The manipulators 28, 30 are connected to each other via a common base 31 and are constructed symmetrically. Each manipulator 28, 30 has three links 32 and three joints 34 and at the ends of each manipulator 28, 30 there is an end effector 36, which is a gripper in present example. Both manipulators 28, 30 can jointly grip and move a workpiece 38. The connection via workpiece 38 creates a closed kinematic chain 40, which is indicated here by the dotted line.

During the movement of the two manipulators 28, 30 and thus also during their movement planning, this closed kinematics must be taken into account, as otherwise the manipulators 28, 30 would drop the workpiece 38.

The movement of the first manipulator 28 and the second manipulator 30 is coordinated by a control unit 42. The control unit 42 carries out the method described above, i.e. the control unit 42 determines a coordinated movement path for both the first manipulator 28 and the second manipulator 30 taking into account the closed kinematics. The control unit 42 is thus configured to solve the underlying optimization problem numerically.

Preferably, the control unit 42 carries out planning and execution in parallel. This means that the manipulators 28, 30 are already moved even before an optimal and complete motion planning has taken place.

In addition to the closed kinematics, the control unit 42 also takes into account obstacles 44, which are located in the movement range of the manipulators 28, 30. Particularly, not only static obstacles, but also to moving obstacles in the movement space are taken into account.

Due to parallel planning and execution including continuous optimization, a changing environment can be taken into account.

The phrase at least one of A, B, and C should be construed to mean a logical (A OR B OR C), using a non-exclusive logical OR, and should not be construed to mean "at least one of A, at least one of B, and at least one of C."

What is claimed is:

1. A method for collision-free motion planning for a first manipulator with closed kinematics, the method comprising:
defining a dynamic optimization problem;
solving the optimization problem via a numerical approach;
determining a first movement path for the first manipulator based on the solution of the optimization problem; and
executing the first movement path by controlling the first manipulator to travel along the first movement path,
wherein the dynamic optimization problem comprises
a dynamic that defines states and control variables of the first manipulator as a function of time,
a cost function that weights the states and the control variables of the first manipulator,
at least one inequality constraint for a distance to collisions, and
at least one equality constraint for closed kinematics, and
wherein the optimization problem is solved on a successively shortened time horizon T in parallel with the execution of the first motion path.

2. The method according to claim 1, wherein the dynamic optimization problem additionally comprises boundary conditions that define a start condition and an end condition.

3. The method according to claim 2, wherein the boundary conditions are a start position and a target position of the first manipulator.

4. The method according to claim 1, wherein the dynamic optimization problem further comprises one or more control variable constraints defining minimum and maximum values of the control variables.

5. The method according to claim 4, wherein the one or more control variable constraints include at least one of a minimum speed, a minimum acceleration, a maximum speed, and a maximum acceleration of the first manipulator.

6. The method according to claim 1, wherein the dynamic optimization problem further comprises one or more state constraints defining limits of the states.

7. The method according to claim 6, wherein the one or more state constraints include at least one of a minimum joint angle, a minimum joint angular velocity, a maximum joint angle, and a maximum angular velocity of the first manipulator.

8. The method according to claim 1, wherein the dynamic optimization problem further comprises a defined end time T defining a duration of the movement.

9. The method according to claim 8, wherein the end time T is selected to be a fixed value.

10. The method according to claim 8, wherein the end time T is weighted by the cost function.

11. The method according to claim 8, wherein the dynamic optimization problem further comprises one or more end time constraints.

12. The method according to claim 11, wherein the end time constraints includes at least one of a minimum end time and a maximum end time.

13. The method according to claim 1, wherein the at least one inequality constraint for a distance to collisions defines a minimum distance to collisions.

14. The method according to claim 1, wherein the at least one equality constraint for the closed kinematics defines a first dynamic position constraint of the first manipulator.

15. The method according to claim 1, wherein the at least one equality constraint for the closed kinematics defines a first dynamic orientation constraint of the first manipulator.

16. The method according to claim 1, wherein the numerical approach comprises transforming the dynamic optimization problem from a constrained optimization problem into an unconstrained optimization problem.

17. The method according to claim 16, wherein the at least one equality constraint for the closed kinematics and the at least one inequality constraint for a distance to collisions are each multiplied by a multiplier and added to the cost function.

18. The method according to claim 16, wherein the at least one equality constraint for closed kinematics and the at least one inequality constraint for a distance to collisions are multiplied in squared form by a penalty parameter and added to the cost function.

19. The method according to claim 18, wherein, for solving the dynamic optimization problem, the multiplier and the penalty parameter are iteratively adapted.

20. The method according claim 16, wherein the numerical approach comprises a gradient approach for solving the unconstrained optimization problem.

21. The method according to claim 1, wherein:
the dynamic optimization problem has an end time T that defines a duration of the movement, the numerical approach generates in a first step a first partial solution for at least one first period, the first period is smaller than the duration of the movement, the numerical approach generates in at least one second step a second partial solution for a second period, and for the second step, an adapted optimization problem is used that corresponds to the dynamic optimization problem and takes into account a state at the end of the first period as an initial condition.

22. The method according to claim 1, further comprising:

determining a second movement path for a second manipulator, wherein the cost function additionally weights the states and control variables of the second manipulator, wherein the dynamics defines the states and control variables of the second manipulator as a function of time, and wherein the first manipulator and the second manipulator form the closed kinematics.

23. The method according to claim 22, wherein the at least one equality constraint for the closed kinematics comprises a first dynamic position constraint of the first manipulator and a second dynamic position constraint of the second manipulator, which are in a defined, fixed relationship to one another, so that the closed kinematics is fulfilled.

24. The method according to claim 22, wherein the at least one equality constraint for the closed kinematics comprises a first dynamic orientation constraint of the first manipulator and a second orientation constraint of the second manipulator, which are in a defined, fixed relationship to one another, so that the closed kinematics is fulfilled.

25. An apparatus comprising:

a first manipulator; and a control unit for collision-free motion planning for the first manipulator based on a dynamic optimization problem, wherein the control unit is configured to:
  solve the optimization problem via a numerical approach,
  determine a first movement path for the first manipulator based on the solution of the optimization problem, and
  execute the first movement path by controlling the first manipulator to travel along the first movement path, wherein the dynamic optimization problem comprises:
  a cost function that weights states and control variables of the first manipulator,
  a dynamic that defines states and control variables of the first manipulator as a function of time,
  at least one inequality constraint for a distance to collisions, and
  at least one equality constraint for closed kinematics, and wherein the control unit is configured to solve the optimization problem on a successively shortened time horizon T in parallel with the execution of the first movement path.

* * * * *